United States Patent Office 3,367,857
Patented Feb. 6, 1968

3,367,857
SIDE-CHAIN CHLORINATION OF RING-SUBSTITUTED ACETOPHENONES
Jürgen F. Falbe, Bonn, and Hans-Jürgen Schulze-Steinen, Hangelar, Germany, assignors to Shell Oil Company, New York, N.Y., a corporation of Delaware
No Drawing. Continuation-in-part of application Ser. No. 506,580, Nov. 5, 1965. This application Oct. 24, 1966, Ser. No. 588,726
Claims priority, application Germany, Feb. 17, 1965, S 95,514; Oct. 27, 1965, S 100,236
10 Claims. (Cl. 204—158)

This application is a continuation-in-part of copending U.S. application Ser. No. 506,580, filed Nov. 5, 1965, now abandoned.

This invention relates to an improved process for the production of side-chain chlorinated ring-substituted acetophenones, and more particularly, to the liquid phase chlorination of ring-substituted acetophenones to the corresponding 2,2-dichlorinated ring-substituted acetophenones.

Certain polyhaloacetophenones have been prepared by Friedel-Crafts reaction (see, for example, French Patent 1,330,953, June 28, 1963) in which a halobenzene is condensed with chloroacetyl chloride. E. E. Gilbert et al., U.S. 3,003,916, Oct. 10, 1961, suggest high-temperature chlorination, e.g., 120–140° C., of ring-halogenated acetophenones to chlorinate the side chain. J. G. Aston et al., in "Organic Syntheses," Coll. vol. III, 538, John Wiley and Co., New York, 1955, disclose the side-chain chlorination of unsubstituted acetophenone in glacial acetic acid at temperatures below 60° C. Similar findings are described by Mauri in Farmaco, Ed. Prat. 18 (1963), 651. All these processes are disadvantageous in that either the starting materials used are difficult to obtain or the products are of insufficient purity and obtained in unsatisfactory yields or the reaction time is slow.

It is a principal object of this invention to provide an improved process for the side-chain chlorination of ring-substituted acetophenones to produce rapidly in high yield and in a high state of purity the corresponding 2,2-dichlorinated ring-substituted acetophenones.

Now, in accordance with the present invention it has been found that ring-substituted acetophenones can be advantageously chlorinated in the side chain to produce 2,2-dichlorinated ring-substituted acetophenones by conducting the chlorination at a temperature from 10° to 100° C., in the presence of hydrochloric acid, and in the presence of a lower alkanoic acid solvent of 1 to 4 carbon atoms consisting essentially of at least about 50% by weight of formic acid, for a period of time sufficient to give essentially complete conversion of the ring-substituted acetophenones to the 2,2-dichlorinated ring-substituted acetophenones. In view of the known, strong reducing properties of formic acid and its tendency to decompose in the presence of strong acids (cf. "Ullmanns Enzylopädie der technischen Chemie," vol. III, 1953, page 437), it is surprising that the formic acid used is substantially stable under the reaction conditions, i.e., in the presence of chlorine and hydrochloric acid. The process according to the invention has the advantage of resulting in the desired 2,2-dichlorinated product in a shorter reaction time and with higher selectivity, only small proportions of the undesired 2,2,2-trichlorinated product being formed.

A variety of ring-substituted acetophenones may be used as suitable starting materials for the process of the invention. In the nomenclature of such compounds, as well as of the side-chain chlorinated products obtained therefrom in the process, conventional numbering of the ring system has been employed, as further illustrated by the following formula:

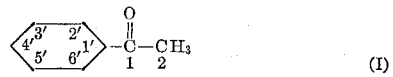

(I)

Representative examples of suitable ring-substituted acetophenones, named according to the aforesaid system, include acetophenones substituted in the ring with halo groups such as chloro, bromo and fluoro; with nitro groups; with lower alkyl groups; with lower alkylsulfonyl groups; and with combinations thereof—for example: 4'-chloroacetophenone, 2'-chloroacetophenone, 4'-nitroacetophenone, 4'-methylsulfonylacetophenone, 2'-chloro-4'-methylacetophenone, 4' - chloro - 2' - methylacetophenone, 2',4'-, 2',5'-, 2',6'-, or 3',4'-dichloroacetophenone, 4'-bromoacetophenone, 2',4'-dibromoacetophenone, 2',5'-dibromoacetophenone, 2',4' - difluoroacetophenone, 2'-chloro-4'-bromoacetophenone, 2'-chloro-5'-bromoacetophenone, 2'-fluoro-4'-bromoacetophenone, 2'-fluoro-5'-bromoacetophenone, 2'-fluoro-4'-chloroacetophenone, 2'-fluoro-5'-chloroacetophenone, 2',4',5'-, 2',3',6'-, 2',3',4'-, 2',4',6'-, or 2',3',5'-trichloroacetophenone, 2',4',5'-tribromoacetophenone, 2' - bromo - 4',5' - dichloroacetophenone, 4'-bromo-2',5'-dichloroacetophenone, 4'-fluoro-2',5'-dichloroacetophenone, and 2'-nitro-4'- or 5'-chloroacetophenone. Preferred starting materials are the 2',4'- and 2',5'-dihaloacetophenone, especially 2',4'- and 2',5'- dichloroacetophenone. The 2',4',5'-trichloro- and 2',4',5-tribromoacetophenone are also valuable starting materials.

The process according to the invention enables a selective dichlorination in the 2-position to be carried out. 2,2-dichlorinated products can also be formed by starting from 2-monochlorinated products. For example, starting from 2,2',4'-trichloroacetophenone, 2,2,2',4'-tetrachloroacetophenone can be obtained by chlorination and 2,2-dichloro-4'-bromoacetophenone can be obtained from 2-chloro-4'-bromoacetophenone. However, the route from 2-monochlorinated products has little practical value since, according to the invention, 2,2-dichlorinated acetophenone can easily be obtained in a commercially feasible one-step chlorination of ring-substituted acetophenone.

In the 2,2-dichlorination of acetophenone substituted in the nucleus, the starting-material acetophenones, e.g., halogenated or nitrated in the nucleus, can be prepared according to known processes, such as by the Friedel-Crafts reaction between halogenated or nitrated benzene and acetyl chloride or monochloroacetyl chloride. The resulting ring-substituted acetophenone can be recovered by means of distillation after completion of the reaction. It has been found that it is not essential to use pure ring-substituted acetophenone for the subsequent chlorination. Minor amounts of the halogenated or nitrated benzene, for instance from 5% to 20% by weight based on ring-substituted acetophenone, do not substantially adversely affect the course of the chlorination and can be easily separated in the further processing of the chlorination product. The starting material is chlorinated in the most concentrated form possible.

The solvent comprises at least about 50% by weight of formic acid. In a preferred modification of the process, the solvent comprises at least about 75% by weight of formic acid. When using mixtures of formic acid and a carboxylic acid having less than 5 carbon atoms, such as acetic acid, propionic acid, butyric acid, but especially glacial acetic acid, the proportion of solvent required can be decreased by about 25 to 100% and more without being noticeably detrimental to the selectivity of the process according to the invention. Apart from these advantages it may, however, be stated that the reaction time is considerably shorter when using pure formic acid as solvent than in the event of mixtures of formic acid and carboxylic acid being employed.

It is known that pure formic acid melts at 8.4° C. In the solution of the starting material or in the mixture with, for example, acetic acid, the melting point is, however, lowered, a further lowering being effected by the added or formed proportions of chlorine and hydrochloric acid. Technical grade formic acid, for example 85–99% acid, also melts at lower temperatures. A solvent containing at least 95%, especially at least 98%, formic acid is preferred. Thus, difficulties resulting from solidification of the reaction mixture at low temperatures are easy to avoid.

The 2,2-dichlorination is conveniently conducted in such a way that the total quantity of chlorine added is taken up by the reaction mixture. A certain proportion of free chlorine will then be present in the reaction mixture. It is not advisable to add larger quantities of chlorine quickly as this easily results in the formation of two phases. The proportion of chlorine to be effectively added depends on the reaction rate. The reaction time is generally a period of time sufficient to give essentially complete conversion of the ring-substituted acetophenone to the 2,2-dichlorinated ring-substituted acetophenone and depends on the rate at which chlorine is added. The chlorination can generally be completed in from 1 to 8 hours.

In general, elevated temperatures from 10° to 100° C., preferably 20°–60° C., are used for the preparation of the 2,2-dichlorination product. When starting from acetophenones brominated in the nucleus, it is preferable to select a chlorination temperature not exceeding 35° C. Under these conditions starting material and product have better solubility in formic acid.

The concentration of the starting material employed in this case is such as to avoid the formation of precipitate. For example, use is made of reaction mixtures containing 50 to 500 g./l., preferably 100 to 350 g./l., of starting material. The chlorination is conveniently conducted with stirring at atmospheric pressure. Lower or higher pressures may be used but, on account of the elevated temperatures, it may be advantageous to operate at higher than atmospheric pressure.

In the preparation of the dichlorination product, it is advantageous—but not essential—to operate under irradiation. Light sources radiating mainly in the range of 400 to 500 mμ proved to be favorable. Suitable light sources are, for example, fluorescent tubes, such as Philips tubes TL5 and TL18, or also simple daylight lamps and incandescent lamps. Although daylight can also be used, it is less suitable for practical purposes on account of the wide variations in intensity.

The dichlorination product can be separated from the reaction mixture in a conventional manner, e.g., by distillation. The resulting product is of a very high purity and is obtained in a good yield.

It is, of course, possible to carry out batchwise as well as continuously and semicontinuously the various operations such as chlorination, distillation, addition of starting material, and the like.

It was also found that, in chlorinating according to the invention an induction period occurs, which can be ascribed to the formation of hydrochloric acid in the reaction mixture. The induction period can be avoided and a corresponding reduction of the reaction time achieved by the addition from the outset of hydrochloric acid as catalyst to the reaction mixture, as suggested by Wilkinson et al., U.S. 2,619,505, Nov. 25, 1952, in their in situ production of a 2-monohalogenated product by reacting a halogen with an acetic acid solution containing unisolated intermediate 4-nitroacetophenone. To this end addition of 0.1 to 5% by weight of hydrochloric acid, based on the solvent, will suffice. It has now been found that the selectivity with respect to the 2,2-dichlorinated ring-substituted acetophenone can be increased if, during the chlorination, the reaction mixture is saturated continuously or intermittently at intervals of about 15 to 60 minutes, preferably about 30 minutes, with hydrogen chloride. The simplest way to achieve saturation with hydrogen chloride at the particular conditions of the reaction is to add hydrogen chloride to the chlorine stream being introduced to the reaction mixture, preferably in a molar ratio of between 1:0.1 and 1:2. The addition can be carried out continuously or intermittently at intervals of not more than one hour. Replacement of α-hydrogen atoms in carbonyl compounds is believed to proceed by way of acid-catalyzed enol formation in the rate-determining step followed by rapid reaction of the enol form with halogen. Since hydrogen chloride is formed in situ, as a by-product in the chlorination process of the invention, it is surprising that saturation with hydrogen chloride by continuous or intermittent addition has such a marked improvement on the chlorination. It may be that hydrogen chloride formed in situ is removed physically during the passage of chlorine through the reaction mixture.

The substances prepared according to the invention are useful as bactericides, fungicides and insecticides as well as starting materials for further synthesis.

It has been found that the 2,2-dichlorinated products are unstable in storage. Their decomposition results in the formation of phosgene. If these compounds are used for further syntheses, it is advisable for them to be converted further immediately after their preparation, for example with triethyl phosphite. If it is desired to use or temporarily store the produce as such, decomposition of the product can be prevented by storing it with exclusion of air or by adding peroxide inhibitors. Suitable inhibitors are, for example, polyhydric phenols such as pyrocatechol, pyrogallol, especially also sterically hindered phenols, such as 2,6-di(tert-butyl)-4-methylphenol and bis[3,5-di(tert-butyl)-4-hydroxyphenyl]methane.

*Example I*

One hundred and twenty grams of 2′,4′-dichloroacetophenone was dissolved in a mixture of 1200 ml. of formic acid (sp. gr. 1.22) and 25 g. of HCl. The temperature was maintained at 30° C. Chlorine gas was introduced for 1½ hours with stirring and under irradiation with a daylight lamp. In the first hour the chlorine was entirely taken up by the reaction mixture, the mixture becoming yellowish-green owing to the presence of free chlorine in the solution. After 1½ hours, nitrogen was passed through to free the mixture from chlorine. The solvent was distilled off, 1438 g. of formic acid, containing 2% HCl, being recovered. The residue consisted of 2,2,2′,4′-tetrachloroacetophenone. Yield: 100%. Purity: 98% of tetrachloroacetophenone, 1.5% of 2,2′,4′-trichloroacetophenone and 0.5% of 2,2,2,2′,4′-pentachloroacetophenone (determined gas chromatographically by comparison with authentic materials); $n_D^{20}=1.5840$.

When the experiment was repeated without irradiation, under otherwise identical conditions, the yield of trichloroacetophenone after 1½ and 3 hours was 6% and 2.5%, respectively, of tetrachloroacetophenone, 94 and 97.5%, respectively, and of pentachloroacetophenone, 0.0 and less than 0.5%, respectively.

By way of comparison 30 g. of 2′,4′-dichloroacetophenone was chlorinated in 120 ml. of 75% acetic acid for 3 hours at a temperature of 30° C. under irradiation with a daylight lamp. Yield: 35% of trichloroacetophenone, 2% of tetrachloroacetophenone, 63% of starting material. An experiment in glacial acetic acid carried out under irradiation at a temperature of 50° C., the chlorination time being 5 hours, yielded at 100% conversion: 4% or trichloro-, 85% of tetrachloro- and 11% of pentachloroacetophenone. Chlorination in the melt (cf. E. E. Gilbert et al., U.S. 3,003,916, Oct. 10, 1961) carried out under irradiation for 2½ hours at 130° C. yielded, at 100% conversion, 33% of tri-, 60% of tetra- and 7% of pentachloroacetophenone. Other solvents, such as carbon tetrachloride, chloroform, carbon disulfide and ether yielded no better results.

Example II

At a temperature of 30° C., 20 g. of 2′,5′-dichloroacetophenone dissolved in 200 ml. of formic acid (sp. gr. 1.22) was chlorinated in the presence of 2% hydrochloric acid for 5 hours with stirring and under irradiation with a daylight lamp. After the solvent had been evaporated and dried in vacuo, the yield was 99% of 2,2,2′,5′-tetrachloroacetophenone containing 1% of 2,2′,5′-trichloroacetophenone. A product of equal purity was obtained by chlorination for 3½ and 2 hours at temperatures of 40° and 50° C., respectively.

Example III

Sixty grams of 4′-chloroacetophenone was chlorinated in 240 ml. of formic acid (sp. gr. 1.22; 2% HCl) for 1½ hours at 30° C. as described in Example II to give 59 g. of 2,2,4′-trichloroacetophenone of 98% purity and having a melting point 61.5° C., containing 2% of 2,4′-dichloroacetophenone.

Example IV

Twenty grams of a mixture of 90% of 2′,4′,5′- and 10% of 2′,3′,6′-trichloroacetophenone was chlorinated in 200 ml. of formic acid (2% HCl) for 4 hours at a temperature of 30° C., as described in Example II. Yield: 26 g. of a product consisting of 94% of pentachloroacetophenone (90% of 2,2,2′,4′,5′- and 10% of 2,2,2′,3′,6′-pentachlorination product) and 6% of tetrachloroacetophenone. Similar results were obtained from a chlorination lasting 3½ hours at a temperature of 50–60° C.

Example V

A 100-liter Pfaudler boiler was charged with 4.75 kg. of 2′,4′-dichloroacetophenone, 47.5 liters of formic acid (98%) and 250 g. of gaseous hydrochloric acid. The mixture was chlorinated with stirring in the dark for 5 hours at a temperature of 30° C., using 78% of excess chlorine, which was removed together with the hydrochloric acid in vacuo after chlorination. Subsequently, the formic acid was distilled off at atmospheric pressure and recovered (45 liters). Conversion: 100%; yield of 2,2,2′,4′-tetrachloroacetophenone: 100%. Purity: 98%. This product was used for the preparation of 2-chloro-1-(2,4-dichlorophenyl)-vinyl diethyl phosphate by conventional conversion (cf. U.S. 3,003,916) with 10% excess triethyl phosphite to give phosphoric ester of 98% purity in a yield of 100%; $n_D^{22} = 1.5269$. The product contained less than 0.5% of phytotoxic 2,2-dichloro-1-(2,4-dichlorophenyl) vinyl diethyl phosphate.

Example VI

Twenty grams of 4′-bromoacetophenone in 200 ml. of formic acid/glacial acetic acid (50:50 parts by weight) was heated to 30° C. in the presence of light, saturated with HCl gas, chlorine subsequently being introduced. The reaction process was followed by sample-taking as shown in Table 1.

TABLE 1

| Reaction Time, min. | Starting Material, Percent | 4′-bromo-2-chloroaceto-phenone, Percent | 4′-bromo-2,2-dichloroaceto-phenone, Percent |
|---|---|---|---|
| 15 | 29 | 30.5 | 40.5 |
| 30 | 7 | 17.5 | 75.5 |
| 45 | | 2.0 | 98.0 |
| 47 | | 1.0 | 99.0 |

The reaction mixture was cooled to 0° C. to give 24.0 g. of crystalline 4′-bromo-2,2-dichloroacetophenone (90% of theory), purity 100%.

*Analysis.*—Calculated for $C_8H_5OCl_2Br$: C, 35.8; H, 1.86; Cl, 26.4; Br, 29.8. Found: C, 35.7; H, 2.2; Cl, 27.0; Br, 29.2. The solvent contained 9% of theory of 4′-bromo-2,2-dichloroacetophenone and 1% of starting material, which could be recycled.

The unexpected improvement achieved by the process of the invention is well illustrated by the results in Table 1 above. When the chlorination is conducted in a solvent containing 50% by weight of formic acid and 50% by weight of glacial acetic acid, 99% of the product obtained is the desirable 2,2-dichlorinated compound and only 1% of the product obtained is the 2-monochlorinated product. Thus, the improved production of 2,2-dichlorinated ring (halo)-substituted acetophenones advantageously is effected by conducting the chlorination in a lower alkanoic acid solvent of 1 to 4 carbon atoms consisting essentially of at least about 50% by weight of formic acid.

Example VII

To determine the effect of the solvent on the course of the reaction, 2′,4′-dichloroacetophenone was chlorinated under irradiation with a daylight lamp, as described in Example I. The results are shown in Table 2.

TABLE 2

| Run | Solvent | Solvent Composition, Weight Percent | Weight Ratio Solvent/Starting Material | Chlorination Temperature, °C. | Reaction Time, hours | Composition of the Final Chlorinated Product, Percent | | |
|---|---|---|---|---|---|---|---|---|
| | | | | | | Mono-a | Di-b | Tri-c |
| | Glacial acetic acid | 100 | 2:8:1 | 40 | 6 | 1 | 82 | 17 |
| | do | 100 | 2:8:1 | 20 | 12 | 13 | 84 | 3 |
| | Formic acid (98%) | 100 | 12:0:1 | 30 | 1.5 | <1.5 | >98 | 0.5 |
| | Formic acid/glacial acetic acid (183 g./50 g.) | 78.5/21.5 | 6:9:1 | 30 | 8 | 1 | 98.5 | 0.5 |
| | Formic acid/glacial acetic acid (230 g./62 g.) | 78.8/21.2 | 4:3:1 | 30 | 6 | 1 | 98.5 | 0.5 |
| | do | 78.8/21.2 | 4:3:1 | 50 | 4 | 1 | 98.5 | 0.5 | a 2,2′,4′-trichloroacetophenone.
b 2,2,2′,4′-tetrachloroacetophenone.
c 2,2,2,2′,4′-pentachloroacetophenone.

The unexpected improvement achieved by the process of the invention is further illustrated by the results in Table 2 above. Under similar conditions of reaction, the use of glacial acetic acid alone in the chlorination produced only 82% of the desired 2,2-dichlorinated product and 17% of the undesired 2,2,2-trichlorinated product (see Run 1) and at a lower temperature, only 84% of the desired 2,2-dichloro compound and 13% of the corresponding 2-monochlorinated compound (see Run 2). By replacing the glacial acetic acid with formic acid, the proportion of desirable 2,2-dichloro compound in the chlorination product is surprisingly raised to 98% with almost negligible amounts of corresponding 2,2,2-trichloro and 2-monochloro compounds (see Run 3). Even more surprising is the result when a portion of the formic acid is replaced by acetic; viz., a solvent mixture of 78.5% by weight of formic acid and 21.5% by weight of acetic acid produces a chlorination product containing 98.5% of desired 2,2-dichloro compound, 1% of 2-monochloro compound, and 0.5% of 2,2,2-trichloro compound (see Run 4). Similar results are obtained with solvent mixtures containing 78.8% by weight of formic acid and 21.2% by weight of acetic (see Runs 5 and 6). Thus, the improved production of 2,2-dichlorinated ring(halo)-substituted acetophenones preferably is effected by conducting the chlorination in a lower alkanoic acid solvent of 1 to 4 carbon atoms consisting essentially of at least about 75% by weight of formic acid.

Example VIII

In each of a series of runs acetophenone chlorinated in the nucleus was dissolved in formic acid and brought to the reaction temperature. The mixtures were first saturated with HCl by passing HCl through them for ten minutes. Chlorine gas was then added with stirring in the dark. In several cases additional HCl was passed through for one minute at half-hourly intervals during the chlorination (Method I); in other cases HCl was passed through continuously (Method II). Optionally, the waste gases, consisting of HCl and chlorine gas, can be recirculated. During the course of the reaction, samples were taken at regular intervals and analyzed by means of gas chromatography for their content of 2-monochloro and 2,2-dichloro product. The results and reaction conditions are given in Table 3 below.

A comparison of Runs 10 and 11 shows that a continuous saturation of the reaction mixture with HCl is advantageous in that it increases the selectivity with respect to the 2,2-dichloro product. In the comparative Run 11, HCl was passed through only for ten minutes at the beginning.

groups selected from the class consisting of chloro, bromo and fluoro, in a solvent consisting essentially of a mixture of 1 to 4 carbon atom lower alkanoic acids and formic acid said mixture containing at least 50% by weight formic acid and for a period of time sufficient to give essentially complete conversion of the ring-substituted acetophenone to the 2,2-dichlorinated ring-substituted acetophenone.

2. The process according to claim 1 wherein the solvent consists essentially of at least about 75% by weight of formic acid.

3. The process according to claim 1 wherein the lower alkanoic acid solvent is formic acid.

4. The process according to claim 1 wherein the solvent is a mixture of formic acid and glacial acetic acid.

5. The process according to claim 1 carried out at a temperature between 20° and 60° C.

6. The process according to claim 1 wherein the ring-substituted acetophenone is 2′,4′-dichloroacetophenone and the 2,2-dichlorinated product is 2,2,2′,4′-tetrachloroacetophenone.

7. The process according to claim 6 carried out under irradiation with a light source radiating principally in the range of 400 to 500 m$\mu$.

8. The process according to claim 1 wherein the reaction mixture is saturated continuously or intermittently at intervals of 15 to 60 minutes with hydrogen chloride.

9. The process according to claim 8 wherein the hydrogen chloride is introduced by adding it to the chlorine reagent.

10. The process according to claim 9 wherein the molar ratio of chlorine to hydrogen chloride is between 1:0.1 and 1:2.

TABLE 3

| Run | Substituted Acetophenone, g. | Formic Acid, ml. | Reaction Temperature, °C. | Method of Saturation | Composition of the Product, Percent (2-mono/2,2-di/2,2,2-tri-acetophenone) according to reaction time (hours) | | | | | | | | | |
|---|---|---|---|---|---|---|---|---|---|---|---|---|---|---|
| | | | | | 0.5 | 1.0 | 1.5 | 2.0 | 2.5 | 3.0 | 3.5 | 4.0 | 4.5 | 5.0 |
| 1 | 20 A | 200 | 30 | I | 61/38/0 | 55/44/0 | 52/48/0 | 50/50/0 | 36/64/0 | 19/81/0 | | | | 5.55 hr. 8/92/0 |
| 2 | 20 A | 200 | 40 | I | 50/37/0 | 21/79/0 | 12/88/0 | 9/91/0 | 7/93/0 | 5/95/0 | 3/96/1 3.75 hr. | | | |
| 3 | 100 A | 1,000 | 40 | I | | 23/77/0 | | 8/92/0 | | 5/95/0 | 3/97/0.3 | 1/98/0.7 | | |
| 4 | 20 A | 200 | 50 | I | 18/82/0 | 6/94/0 | 5/95/0 | 4/96/0 | 2/97/1 | 2/97/1 | | | | |
| 5 | 30 A | 150 | 40 | I | | 25/75/0 | | 15/85/0 | | 7/93/0 | 4/96/0 | 3/96/1 | 3/96/1 | 2/97/1 |
| 6 | 50 A | 150 | 40 | II | | 40/60/0 | | 14/86/0 | 8/92/0 | 4/96/0 | 3/97/0 | 1/98/0 | | |
| 7 | 45 A, 5 D | 150 | 40 | II | | 45/55/0 | 1.75 hr. | 27/73/0 2.25 hr. | 2.75 hr. | 15/85/0 | 11/89/0 | 9/91/0 | 7/93/0 | 6/94/0 |
| 8 | 50 B | 150 | 30 | II | | 23/77/0 | 7/93/0 | 4/95/1 | 2/97/1 | 1/98/0 3.25 hr. | 3.75 hr. | | | |
| 9 | 45 B, 5 E | 150 | 30 | II | | 34/66/0 | | 24/76/0 | | 8/92/0 4.0 hr. | 55/95/0.3 4.5 hr. | 5.0 hr. | 5.5 hr. | 6.5 hr. | 1/98/1 7.0 hr. |
| 10 | 20 C | 200 | 30 | II | | | | | | 22/78/0 4.0 hr. | 15/85/0 4.5 hr. | 11/89/0 5.0 hr. | 8/92/0 5.5 hr. | 5/94/0.5 6.5 hr. | 3/96/1 7.0 hr. |
| 11 | 20 C | 200 | 30 | | | | | | | 23/75/0 | 20/80/0 | 18/82/0 | 16/84/0 | 14/86/0 | 14/86/0 |

A=2′,5′-dichloroacetophenone; B=2′,4′-dichloroacetophenone; C=90% of 2′,4′,5′- and 10% of 2′,3′6′-trichloroacetophenone; D=p-dichlorobenzene; E=chlorobenzene.

We claim as our invention:

1. The process for the production of 2,2-dichlorinated ring-substituted acetophenone by contacting with chlorine, at a temperature between 10° and 100° C. and in the presence of hydrochloric acid, ring-substituted acetophenone, in which the acetophenone is ring-substituted with halo

References Cited

UNITED STATES PATENTS 2,619,505 11/1952 Wilkinson et al. _____ 260—592
3,121,633 2/1964 Sprague et al. _____ 260—592

DANIEL D. HORWITZ, *Primary Examiner.*